United States Patent
Desanzo et al.

(10) Patent No.: US 8,510,026 B2
(45) Date of Patent: Aug. 13, 2013

(54) DATA CONVERSION SYSTEM AND METHOD FOR CONVERTING DATA THAT IS DISTRIBUTED IN A VEHICLE

(75) Inventors: David Joseph Desanzo, Erie, PA (US); David Schroeck, Erie, PA (US); Todd Goodermuth, Melbourne, FL (US); Veni Mudiam, Erie, PA (US); Matthew Joseph, Erie, PA (US); Sethu Madhavan, Erie, PA (US); Enrique David Torres, Erie, PA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/311,286

(22) Filed: Dec. 5, 2011

(65) Prior Publication Data
US 2012/0316726 A1 Dec. 13, 2012

Related U.S. Application Data

(60) Provisional application No. 61/496,241, filed on Jun. 13, 2011.

(51) Int. Cl.
*G01M 17/00* (2006.01)

(52) U.S. Cl.
USPC ........ 701/120; 701/19; 701/20; 701/24; 701/48; 26/26; 246/167 R; 246/169 S; 246/182 R; 726/26

(58) Field of Classification Search
USPC ........ 701/19, 21, 20, 22, 23, 24, 36, 42, 701/49, 31.5, 32.7, 522, 520; 710/8; 712/28; 726/26
See application file for complete search history.

(56) References Cited

U.S. PATENT DOCUMENTS

| | | | |
|---|---|---|---|
| 4,582,280 A * | 4/1986 | Nichols et al. | 246/182 R |
| 5,956,250 A | 9/1999 | Gudat et al. | |
| 6,336,120 B1 | 1/2002 | Noddings et al. | |
| 6,928,344 B2 | 8/2005 | McWalter et al. | |
| 6,996,397 B2 | 2/2006 | Fraser et al. | |
| 7,219,067 B1 | 5/2007 | McMullen et al. | |
| 7,239,859 B2 | 7/2007 | Madhavan et al. | |
| 7,243,012 B2 | 7/2007 | Miyake et al. | |

(Continued)

FOREIGN PATENT DOCUMENTS

| | | |
|---|---|---|
| DE | 102004059981 A1 | 6/2006 |
| EP | 1 956 794 A2 | 8/2008 |

OTHER PUBLICATIONS

PCT Notification of International Search Report and Written Opinion of PCT/US2012/041985 (16 pages).

*Primary Examiner* — Tuan C. To
*Assistant Examiner* — Jelani Smith
(74) *Attorney, Agent, or Firm* — John A. Kramer; GE Global Patent Operation

(57) ABSTRACT

A data conversion system for a vehicle includes an interface gateway device that is configured to be communicatively coupled with a data acquisition module and a client module. The data acquisition module obtains a value of a data parameter related to operation of the vehicle and communicates the value to the interface gateway device in a first message provided in a first format. The interface gateway device is configured to convert the first format of the first message into a different, second format to form a second message and to communicate the second message to the client module. The client module uses the second message to perform a function for the vehicle.

25 Claims, 4 Drawing Sheets

(56) References Cited

U.S. PATENT DOCUMENTS

| | | |
|---|---|---|
| 7,269,482 B1 | 9/2007 | Shultz et al. |
| 7,280,898 B2 * | 10/2007 | Lesesky et al. ............... 701/31.5 |
| 7,395,141 B1 * | 7/2008 | Seck et al. ...................... 701/19 |
| 7,504,706 B2 | 3/2009 | Swaminathan et al. |
| 7,577,634 B2 | 8/2009 | Ryan et al. |
| 7,647,142 B2 | 1/2010 | Desanzo |
| 7,705,775 B2 | 4/2010 | Madhavan et al. |
| 7,782,814 B2 | 8/2010 | Fraser et al. |
| 7,904,219 B1 | 3/2011 | Lowrey et al. |
| 7,912,149 B2 | 3/2011 | Chesnutt et al. |
| 8,050,673 B2 | 11/2011 | Madhavan et al. |
| 8,054,924 B2 | 11/2011 | Madhavan |
| 2003/0117298 A1 * | 6/2003 | Tokunaga et al. ............. 340/989 |
| 2005/0163727 A1 | 7/2005 | Doyle et al. |
| 2006/0193790 A1 | 8/2006 | Doyle et al. |
| 2007/0092024 A1 | 4/2007 | Madhavan et al. |
| 2007/0102811 A1 | 5/2007 | Swaminathan et al. |
| 2007/0120225 A1 | 5/2007 | Swaminathan et al. |
| 2007/0140987 A1 | 6/2007 | Doyle et al. |
| 2007/0190950 A1 | 8/2007 | Madhavan et al. |
| 2007/0258398 A1 | 11/2007 | Chesnutt et al. |
| 2008/0102854 A1 | 5/2008 | Yi et al. |
| 2008/0247484 A1 | 10/2008 | Chesnutt et al. |
| 2008/0255828 A1 | 10/2008 | Chesnutt et al. |
| 2009/0005916 A1 | 1/2009 | Wainwright et al. |
| 2009/0172102 A1 | 7/2009 | Chesnutt et al. |
| 2009/0234522 A1 | 9/2009 | DeSanzo |
| 2009/0249074 A1 | 10/2009 | Madhavan et al. |
| 2009/0323967 A1 | 12/2009 | Peirce et al. |
| 2010/0131127 A1 * | 5/2010 | DeSanzo ........................ 701/19 |
| 2010/0167702 A1 | 7/2010 | Madhavan et al. |
| 2010/0167721 A1 | 7/2010 | Madhavan et al. |
| 2010/0167722 A1 | 7/2010 | Madhavan et al. |
| 2010/0167727 A1 | 7/2010 | Madhavan et al. |
| 2010/0167737 A1 | 7/2010 | Madhavan et al. |
| 2010/0167745 A1 | 7/2010 | Madhavan et al. |
| 2010/0185472 A1 | 7/2010 | Goodermuth et al. |
| 2010/0202616 A1 | 8/2010 | Peirce et al. |
| 2010/0241295 A1 | 9/2010 | Cooper et al. |
| 2010/0286853 A1 | 11/2010 | Goodermuth et al. |
| 2010/0321170 A1 | 12/2010 | Cooper et al. |
| 2011/0038307 A1 | 2/2011 | Madhavan et al. |
| 2011/0039527 A1 | 2/2011 | Yi et al. |
| 2011/0039528 A1 | 2/2011 | Yi et al. |
| 2011/0039533 A1 | 2/2011 | Yi et al. |
| 2011/0039538 A1 | 2/2011 | Madhavan et al. |
| 2011/0039556 A1 | 2/2011 | Yi et al. |
| 2011/0039587 A1 | 2/2011 | Madhavan et al. |
| 2011/0060486 A1 | 3/2011 | Meltser et al. |
| 2011/0068976 A1 | 3/2011 | Basnayake et al. |
| 2011/0093144 A1 | 4/2011 | Goodermuth et al. |
| 2011/0099413 A1 | 4/2011 | Cooper et al. |
| 2011/0144858 A1 * | 6/2011 | Yun et al. ........................ 701/33 |
| 2011/0144911 A1 | 6/2011 | Madhavan et al. |
| 2011/0217957 A1 | 9/2011 | Macdonald et al. |
| 2011/0249714 A1 | 10/2011 | Madhavan et al. |
| 2011/0270475 A1 * | 11/2011 | Brand et al. .................... 701/20 |
| 2011/0282525 A1 | 11/2011 | Kraeling et al. |
| 2011/0284699 A1 | 11/2011 | Cooper et al. |
| 2011/0284700 A1 | 11/2011 | Brand et al. |
| 2011/0294466 A1 | 12/2011 | Tang et al. |
| 2012/0116633 A1 * | 5/2012 | Kato et al. ...................... 701/36 |

* cited by examiner

DATA CONVERSION SYSTEM AND METHOD FOR CONVERTING DATA THAT IS DISTRIBUTED IN A VEHICLE

CROSS REFERENCE TO RELATED APPLICATIONS

This application claims the benefit of U.S. provisional application Ser. No. 61/496,241, filed Jun. 13, 2011, hereby incorporated by reference in its entirety.

BACKGROUND

Certain vehicles (e.g., powered vehicles or vehicle consists) include communication systems that periodically obtain measurements related to the health, operations, or control of the vehicle. For example, locomotives in a rail vehicle consist ("consist" referring to a group of vehicles linked to travel together along a route, including possible coordinated control by one or more wired and/or wireless connections) may include communication systems that periodically receive measurements related to operations of the locomotive, such as speed, horsepower, temperature, brake pressure measurements, and the like. These measurements represent data parameters of the vehicle, and the values of the data parameters may periodically change. For example, measurements of speed of a traction motor may be a first data parameter, measurements of brake pressures may be a second data parameter, and so on.

The values of the data parameters may be requested and used by computerized services or applications running on the vehicle and/or running off-board the vehicle. These services or applications perform various functions based on the data parameters. For example, the services or applications may control tractive operations and/or braking operations of the vehicle, monitor performance of the vehicle over time, record events of the vehicle, and the like. The systems that acquire the data parameters and that are native to the vehicle, such as the systems that are initially installed in the vehicle, may use a communication protocol to form and communicate data messages that include the values of the data parameters. Over time, the owner of the vehicle may desire to install third party services or applications that use a different communication protocol with a different format to communicate data and/or use the data messages that include the data parameters.

The different formats used by the native systems and the third party services or applications may be incompatible. For example, the native systems and third party services or applications may use different proprietary formats. The formats may be incompatible with each other and, as a result, some third party services or applications may be unable to be used with the native systems.

A need exists for a system and method that allows the systems and services or applications using different communication formats to communicate messages with each other.

BRIEF DESCRIPTION

In one embodiment, a data conversion system for a vehicle is provided. The system includes an interface gateway device that is configured to be communicatively coupled with a data acquisition module and a client module. The data acquisition module obtains a value of a data parameter related to operation of the vehicle and communicates the value to the interface gateway device in a first message provided in a first format. The interface gateway device is configured to convert the first format of the first message into a different, second format to form a second message and to communicate the second message to the client module. The client module uses the second message to perform a function for the vehicle.

In another embodiment, a data conversion system for a vehicle is provided. The system includes an interface gateway device configured to be communicatively coupled with a data acquisition module and a client module. The interface gateway device also is configured to receive a first message provided in a first format from the data acquisition module. The first message includes a value of a data parameter related to operation of the vehicle. The interface gateway device also is configured to convert the first format of the first message into a different, second format to form a second message and to communicate the second message to the client module for use in performing a function for the vehicle.

In another embodiment, another data conversion system for a vehicle is provided. The system includes a first client module configured to be communicatively coupled with an interface gateway device and one or more second client modules. The first client module is configured to receive a data parameter from the interface gateway device in a first message having a closed format. The data parameter is related to operation of the vehicle. The first client module is configured to publish the data parameter for communication of the data parameter to the one or more second client modules for use in performing a function for the vehicle.

In another embodiment, a method for converting data for a vehicle is provided. The method includes receiving a value of a data parameter related to operation of the vehicle in a first message from a data acquisition module. The first message is provided in a first format. The method also includes converting the first format of the first message into a different, second format to form a second message and communicating the second message to a client module, the client module using the second message to perform a function for the vehicle.

In another embodiment, a computer readable storage medium for a data conversion system in a vehicle having a processor is provided. The computer readable storage medium includes one or more sets of instructions that direct the processor to receive a value of a data parameter related to operation of the vehicle in a first message from a data acquisition module. The first message is provided in a first format. The one or more sets, of instructions also direct the processor to convert the first format of the first message into a different, second format to form a second message and to communicate the second message to a client module. The client module uses the second message to perform a function for the vehicle.

In another embodiment, a data conversion system for a vehicle is provided. The system includes an interface gateway device that is configured to be communicatively coupled with a data acquisition module and a client module. The interface gateway also is configured to receive a first message provided in a first format from the data acquisition module. The first message includes a value of a data parameter related to operation of the vehicle. The interface gateway device is configured to convert the first format of the first message into a different, second format to form a second message and to communicate the second message to the client module for use in performing a function for the vehicle.

In another embodiment, a method for converting data for a vehicle includes receiving a data parameter related to operation of the vehicle in a first message. The first message is provided in a closed format and the data parameter is received from an interface gateway device that receives the data parameter from a data acquisition module in an open format. The method also includes publishing the data parameter for communication to one or more client modules to use the data parameter for a function of the vehicle.

DETAILED DESCRIPTION

Figure 1:
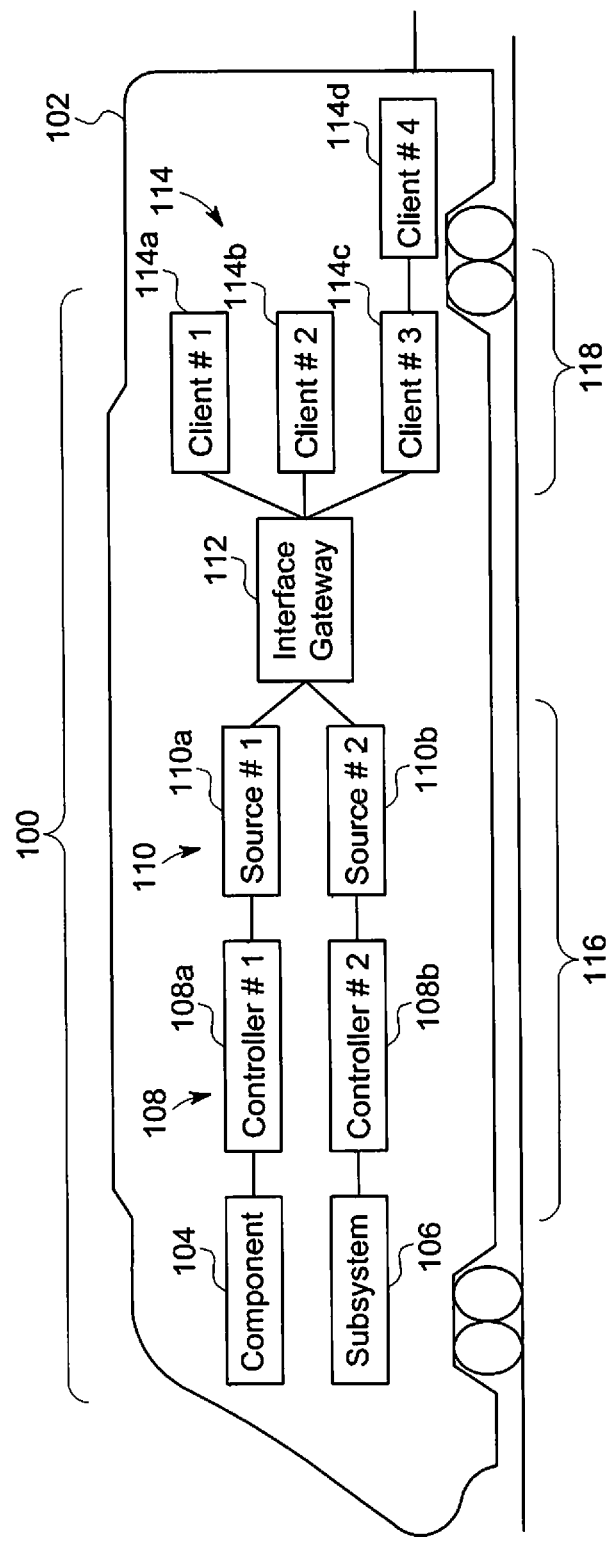
FIG. 1 is a schematic diagram of one embodiment of a vehicle data conversion system disposed on-board a powered vehicle.

One or more embodiments of the inventive subject matter described herein relate to systems and methods for data conversion and communication in a vehicle or vehicle consist. According to one aspect, an interface gateway device is configured to receive vehicle data parameters from data acquisition modules (e.g., modules that acquire/generate the data), and to communicate the data to client modules (e.g., modules that use the data). The interface gateway device may be configured to convert messages containing the data parameters between various formats as required by the data acquisition modules and/or client modules, such as converting between open message formats and closed message formats. Thereby, the interface gateway device may facilitate the distribution of information in a vehicle or vehicle consist between systems onboard the vehicle or vehicle consist that otherwise would not be able to communicate.

The foregoing brief description, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 is a schematic diagram of one embodiment of a vehicle data conversion system 100 disposed on-board a powered vehicle 102. In the illustrated embodiment, the vehicle 102 is illustrated as a rail vehicle, such as a locomotive. Alternatively, the vehicle 102 may be another type of rail vehicle (such as a non-powered cargo car) or a non-rail vehicle, such as another type of off-highway vehicle (OHV) or other vehicle generally. The system 100 is shown in FIG. 1 as being disposed entirely on-board the single vehicle 102. Alternatively, the system 100 may be distributed among several interconnected vehicles, such as by being partially disposed on each of several vehicles that include the vehicle 102 and that are mechanically coupled in a consist or other group.

The system 100 manages the acquisition, conversion, and distribution of data related to operations of the vehicle 102. The vehicle 102 includes one or more components 104 and/or subsystems 106 that perform various operations of the vehicle 102. While only one component 104 and one subsystem 106 are shown in the illustrated embodiment, the system 100 may include a greater number or none of one or more of the component 104 and/or subsystem 106. By way of example, the components 104 and/or subsystems 106 of the vehicle 102 may represent a propulsion subsystem that generates tractive effort for the vehicle 102 to propel itself (e.g., a subsystem that includes one or more traction motors), a braking subsystem that generates braking effort for the vehicle 102 to slow down or stop itself from moving, a wireless communication system that is used to communicate with another vehicle or system outside of the vehicle 102 (e.g., a radio transceiver and antenna), a sensor that obtains data related to the vehicle 102 (e.g., a brake air pressure sensor, a fuel gauge, a cargo sensor, a global positioning system receiver, or the like), a device that receives input from an operator of the vehicle 102 to control the vehicle 102, and the like. The previous list provides a non-limiting example of the types of components 104 and/or subsystems 106 that may be used. In one embodiment, any device, sensor, system, subsystem, memory, module, assembly, processor, or the like may be used as the component 104 and/or subsystem 106. One or more of the components 104 and/or subsystems 106 may be disposed off-board the vehicle 102, such as by being disposed on-board another vehicle that is mechanically coupled or interconnected with the vehicle 102 (e.g., a mechanically linked other vehicle in a rail vehicle consist).

The component 104 and subsystem 106 are operably coupled with controller devices 108 (e.g., "Controller #1" and "Controller #2"). As used herein, the term "operably coupled" includes two or more controllers, devices, sensors, systems, subsystems, assemblies, processors, memories, modules, or the like that are connected by one or more wired and/or wireless communication links, such as cables, busses, other conductive pathways (e.g., copper wires), wireless networks, fiber optic cables, and the like, such as to enable communication of data therebetween. The controller devices 108 are generally referred to by the reference number 108 and individually referred to by the reference numbers 108a and 108b. While two controller devices 108 are shown, alternatively, a smaller or larger number of controller devices 108 may be provided.

The controller devices 108 interface with the components 104 and/or subsystems 106 to obtain one or more of available data parameters from the components 104 and/or subsystems 106. As used herein, the term "available data parameters" includes a set of one or more data parameters having values that may be measured or obtained from the components 104 and/or subsystems 106. The controller devices 108 may include one or more electronic devices that obtain values of one or more of the data parameters from the components 104 and/or subsystems 106. In one embodiment, one or more of the controller devices 108 may direct operations of the components 104 and/or subsystems 106. The controller devices 108 can include sensors that obtain one or more of the data parameters from the components 104 and/or subsystems 106, processors or other logic-based devices, along with associated circuitry, that monitor and/or control the components 104 and/or subsystems 106, and the like.

The data parameters obtained by the controller devices 108 represent data values related to operations of the vehicle 102. As used herein, the term "operations" can refer to performance of the vehicle 102 (e.g., related to actions and events performed in propelling goods and/or passengers), control of the vehicle 102 (e.g., throttle and/or brake settings), and/or health conditions of the vehicle 102 (e.g., a status of the vehicle 102 such as whether maintenance is required for the vehicle 102 or one or more components 104 and/or subsystems 106 are malfunctioning).

For example, if the subsystem 106 includes a propulsion subsystem that includes one or more traction motors and/or a sensor operably coupled with the propulsion subsystem, the controller device 108b may obtain measurements of horsepower generated by the traction motors, measurements of wheel slippage of the wheels connected to the traction motors, temperatures measurements of bearings, wheels, and/or axles interconnected with the traction motors, and the like. If the subsystem 106 includes a braking subsystem that includes air brakes and/or regenerative brakes, the controller device 108b may obtain measurements of air pressure in the air brakes and/or reservoirs connected to the air brakes, measurements of current obtained from the regenerative brakes, settings of the air brakes and/or regenerative brakes, and the like. If the component 104 includes an antenna that is used to communicate with another vehicle or system outside of the vehicle 102, then the controller device 108a can obtain data parameters representative of which communication channels are being used, quality of service (QoS) measurements of communication over the antenna, and the like. If the component 104 includes a sensor, then the controller device 108a can obtain data parameters representative of quantities measured or sensed by the sensor. The above provides a non-exclusive set of data parameters that can be obtained by the controller devices 108. One or more other types of data parameters that relate to operations of the vehicle 102 may be obtained.

The controller devices 108 are operably coupled with data acquisition modules 110 (e.g., "Source #1" and "Source #2"). As used herein, the term "module" includes a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The modules shown in the attached figures may represent the hardware that operates based on software or hardwired instructions, the software that directs hardware to perform the operations, or a combination thereof.

The data acquisition modules 110 are generally referred to by the reference number 110 and individually referred to by the reference numbers 110a, 110b, and 110c. While two data acquisition modules 110 are shown, alternatively, a smaller or larger number of data acquisition modules 110 may be provided. The data acquisition modules 110 interface with the controller devices 108 to acquire the values of the data parameters obtained by the controller devices 108 from the components 104 and/or subsystems 106. While each of the data acquisition modules 110 is shown as only interfacing or communicating with a single controller device 108, alternatively, one or more of the data acquisition modules 110 may interface with a plurality of the controller devices 108.

In the system 100, the data acquisition modules 110 may be referred to as "sources" of the available data parameters as the data acquisition modules 110 acquire the data parameters from the controller devices 108 and produce the data parameters for consumption (e.g., use) by one or more other parts of the system 100, such as client modules 114 described below.

The data acquisition modules 110 are operably coupled with an interface gateway device 112 ("Interface Gateway") in the illustrated embodiment. The interface gateway device 112 manages and controls the conversion and distribution of the data parameters through the system 100, as described in more detail below. For example, the interface gateway device 112 may act as an information gateway between a back end portion 116 of the system 100 and a front end portion 118 of the system 100. The back end portion 116 of the system 100 can generate the data that is used by the front end portion 118 of the system 100 to perform one or more functions, as described below. For example, the back end portion 116 can obtain values of the data parameters that are communicated via the interface gateway device 112 to the client modules 114, which use the values to perform various functions.

The back end portion 116 acquires the values of the data parameters as data and conveys the data in electronic messages (e.g., signals) to the interface gateway device 112. The interface gateway device 112 can receive the data via the messages and communicate the data to the client modules 114. In one embodiment, one or more formats of the data that is communicated from the back end portion 116 to the interface gateway device 112 differs from one or more of the formats of the data that is distributed by the interface gateway device 112 to one or more of the client modules 114. For example, one or more components of the front end portion 116 may use a different communication protocol than one or more components of the back end portion 118. The interface gateway device 112 can convert the data representative of the values of the data parameters from a first format used by one or more components of the back end portion 116 to a different, second format used by one or more components of the front end portion 118.

As described below, in one embodiment, the conversion performed by the interface gateway device 112 includes changing the format of the data from a first format to a different, second format. The first or second formats may be open or closed formats. A "format" of data can represent the syntax in which data is recorded, read, and/or communicated. For example, the format of a communication protocol may be based on a syntax of the protocol, such as one or more rules that define how various combinations of symbols, alphanumeric text, binary bits (e.g., 0's and 1's), and the like, are combined and used to represent and communicate data between a transmitter and a recipient that are communicating using the protocol.

An "open format" includes a format that can be read (e.g., received and able to be used to perform one or more functions) by a plurality of different client modules 114, such as client modules 114 provided by different manufacturers or suppliers and/or that use different communication protocols to communicate and process data. Data communicated in an open format may be implemented (e.g., read, communicated, saved, used to perform a function, and the like) by both proprietary software or modules and open (e.g., open source)

software or modules. An open format can be a format whose rules of syntax are publicly available, or at least provided by an entity that controls or owns the open format to one or more other entities. In one embodiment, an open format represents a format of data that is defined by one or more industry or standards organization for a variety of different entities (e.g., different persons, corporations, and the like) to use to communicate the data. Alternatively, an open format includes a format that is able to be used (e.g., to read and communicate data) by a recipient of the data that is different from the transmitter of the data. In another embodiment, an "open format" may include a format that is based on an open source format of communicating the data.

A "closed format" can include a format that may not be used (e.g., to read or communicate data) by other entities unless the other entities are granted access to details regarding the rules, syntax, and the like, of the format. For example, a closed format may be a proprietary format of a first entity that cannot be used by other entities without the first entity providing the rules and syntax of the format to the other entities. Data communicated in a closed format may be unable to be implemented by proprietary software or modules that use a different format and/or open (e.g., open source) software or modules that use an open format. A closed format can be a format whose rules of syntax are not publicly available.

The interface gateway device 112 can convert the format of data transmitted from the back end portion 116 by changing the format from a closed format to an open format. For example, the data may be communicated in a message in a first, closed format from the data acquisition module 110 to the interface gateway device 112. The interface gateway device 112 may receive the message and convert the format of the data and/or the message into a second, open format. The open format data is then communicated to one or more of the client modules 114.

In another embodiment, the interface gateway device 112 can convert the format of data transmitted from the back end portion 116 by changing the format from an open format to a closed format. For example, the data may be communicated in a message in an open format from the data acquisition module 110 to the interface gateway device 112. The interface gateway device 112 may receive the message and convert the format of the data and/or the message into a closed format. The closed format data is then communicated to one or more of the client modules 114. The interface gateway device 112 may convert the open format data into a plurality of different closed formats. For example, each of a plurality of the client modules 114 may communicate using different closed formats. The interface gateway device 112 can convert the open format data received from the back end portion 116 into each of the plurality of different closed formats and communicate the data to the different client modules 114 in the different closed formats.

In another embodiment, the interface gateway device 112 can convert the format of data transmitted from the back end portion 116 by changing the format from a first closed format to a different, second closed format. For example, the data may be communicated in a message in a first closed format from the data acquisition module 110 to the interface gateway device 112. The first closed format may be a proprietary format used by the producer, manufacturer, or installer of the data acquisition module 110 that acquired the data of the message. The interface gateway device 112 may receive the message and convert the format of the data and/or the message into a different, second closed format. The second closed format may be a proprietary format used by the producer, manufacturer, or installer of one or more of the client modules 114. The second closed format data is then communicated to the client modules 114 that use the second closed format. The interface gateway device 112 may convert one or more closed formats used by the back end portion 116 into a plurality of different closed formats used by the front end portion 118. For example, each of a plurality of the client modules 114 may communicate using different closed formats. The interface gateway device 112 can convert the closed format data received from the back end portion 116 into each of the plurality of different closed formats used by the front end portion 118 and communicate the data to the different client modules 114 in the different closed formats used by the front end portion 118.

The formats used by the components in the back end portion 116 and/or in the front end portion 118 of the system 100 can be predefined. For example, one or more components may be manufactured and/or installed to use a particular format. Alternatively or additionally, the format and/or the data parameters used by one or more components in the back end portion 116 and/or the front end portion 118 may be changed. For example, after installation, the format used by a component may be changed by an operator or user of the system 100.

In one embodiment, the format used by the back end portion 116 of the system 100 may be referred to as a native format. One or more of the components in the back end portion 116 (such as one or more of the controller devices 108 and/or data acquisition modules 110) may be provided or installed in the vehicle 102 by the manufacturer, producer, or seller of the vehicle 102. For example, the vehicle 102 may represent a locomotive produced by General Electric Company, with one or more of the controller devices 108 and/or data acquisition modules 110 installed in the locomotive by General Electric Company (or by another entity on behalf of General Electric Company). One or more of the components in the front end portion 118 (such as one or more of the client modules 114) may be provided or installed by a different, third party, such as an after-market module that is installed after the back end portion 116 is installed and the vehicle 102 is sold to a customer. The format used to communicate data by the client modules 114 may be closed (e.g., proprietary) and differ from the native format. For example, the native format may be a different closed format or an open format. The interface gateway device 112 can convert the data provided in the native format by the back end portion 116 into the format of the third party client module 114 to enable the client module 114 to be used with the back end portion 116.

The interface gateway device 112 can convert the format of the data communicated between the back end portion 116 and the front end portion 118 by changing a syntax of a set of bits of the data included in the messages communicated from the back end portion 116 to the front end portion 118 through the interface gateway device 112. As another example of such conversion, the interface gateway device 112 can unpack or extract one or more subsets of bits of the data in a first message received from the back end portion 116 for inclusion into a different, second message that includes the one or more subsets of bits of the data and that is sent to the front end portion 118 of the system 100. The interface gateway device 112 can convert the data by normalizing values represented by the data in a first message received from the back end portion 116 before sending the normalized values in data that is included in a second message communicated to the front end portion 118. The above examples are not all inclusive as additional conversion mechanisms may be used by the interface gateway device 112.

The client modules 114 ("Client #1" "Client #2," and "Client #3") are operably coupled with the interface gateway device 112. The client modules 114 are generally referred to by the reference number 114 and individually referred to by the reference numbers 114a, 114b, 114c. While three client modules 114 are shown, alternatively, a smaller or larger number of client modules 114 may be provided. The client modules 114 perform functions based on, or by using, at least some of the data parameters. For example, the client modules 114 interface with the interface gateway device 112 to receive the values of the data parameters from the interface gateway device 112. The client modules 114 send requests for data parameters to the interface gateway device 112 and may wait for a response from the interface gateway device 112 that includes the values of the data parameters. The client modules 114 may include or alternatively may be referred to as subscriber modules, which are "listening" devices that obtains the values of the data parameters used by the module by joining an address or a group, such as by issuing a "join" request to the interface gateway device 112 that joins the module to a multicast IP address. The interface gateway device 112 may periodically multicast the values of the data parameters to the IP address and the modules that subscribe to the IP address can receive the values. As described above, the client modules 114 may receive the data representative of the values of the data parameters in a format that is different from the format used by the back end portion 116 due to the gateway interface device 112 converting the format of the data.

A variety of functions related to operations of the vehicle 102 may be performed by the client modules 114. By way of example, a client module 114 may provide a digital video recorder (e.g., a locomotive digital video recorder or LDVR provided by General Electric Company) that obtains video recordings based on the data parameters (e.g., the data parameters may indicate when and/or where to record video). As another example, a client module 114 may provide asset tracking services (e.g., asset tracking system or ATS provided by General Electric Company) that monitors locations of assets (e.g., non-powered units and/or cargo such as goods and/or passengers) being propelled or conveyed by the vehicle 102 based on the data parameters.

A client module 114 may provide control services that control operations of the vehicle 102 and/or one or more other vehicles coupled or interconnected with the vehicle 102. For example, a client module 114 may use the data parameters to control the tractive efforts (e.g., by controlling throttle settings or providing throttle information, such as a throttle notch setting, a distributed power notch setting, and the like) provided by a propulsion subsystem of the vehicle 102 and/or to control braking efforts (e.g., by controlling brake settings or providing braking information, such as a brake notch setting and the like) provided by brakes of the vehicle 102. The client module 114 may be part of a positive train control (PTC) system or a distributed power (DP) system that controls the tractive efforts and/or braking efforts of the vehicle 102 and/or one or more other powered units and/or non-powered units of a consist 100 (shown in FIG. 1) based on the data parameters. Alternatively, one or more of the client modules 114 may provide an energy management application that controls tractive effort and/or braking effort of the vehicle 102 (and/or one or more other powered units or vehicles of a consist 100) based on the data parameters. For example, a client module 114 may control throttle settings and/or brake settings based on a variety of factors represented by the data parameters, such as the types (e.g., horsepower provided) of powered units in a consist 100, the weight of cargo carried by the consist 100, the grade and/or curvature of a track that the vehicle 102 travels along, a geographic location obtained by a GPS receiver, and the like, in order to reduce fuel consumption by the consist 100. One example of such an energy management application may be the Trip Optimizer™ system provided by General Electric Company.

Other examples of a function provided by the client modules 114 can include control of cab signaling of a rail vehicle, an event recorder that monitors and records events related to operation of the vehicle 102, a location recorder that determines a geographic location of the vehicle 102 based on GPS sensor data received by a GPS receiver as a data parameter, fuel monitoring, radio monitoring, a visual display of operations or conditions of one or more components 104 and/or subsystems 106 of the vehicle 102, and the like. The above examples are provided for illustration and are not intended to be limiting on all embodiments of the presently described subject matter.

In one embodiment, a downstream client 114d ("Client #4" in FIG. 1) may be operably coupled with one or more of the clients 114 that are operably coupled with the interface gateway device 112. For example, the downstream client 114d may be coupled with the client 114c, which is coupled with the interface gateway device 112. The downstream client 114d may be connected to the system 100 such that the downstream client 114d does not directly communicate with the interface gateway device 112, but instead communicates indirectly with the interface gateway device 112 by communicating through or via the client 114c.

In connection with at least one embodiment that includes the downstream client 114d, one or more of the data acquisition modules 110 provide data parameters to the interface gateway device 112. As described herein, the interface gateway device 112 can change a format of the data parameters (or a message that includes the data parameters). The interface gateway device 112 communicates the data parameters in the changed format to the client 114c. The client 114c can then communicate the data parameters to the downstream client 114d in the changed format. Alternatively, the client 114c may change the format of the data parameters a second time. For example, the data parameters may be provided from the data acquisition modules 110 to the interface gateway device 112 in an open format. The interface gateway device 112 can convert the data parameters into a different, first closed format and communicate the data parameters in the first closed format to the client 114c. The client 114c, which can be referred to as a publisher client 114c, can then communicate the data parameters in the first closed format to one or more downstream clients 114, such as the client 114d. Alternatively, the client 114c may change the format of the data parameters from the first closed format to a different, second closed format or back to an open format and communicate the data parameters to the downstream client 114d in this changed format.

The publisher client 114c may communicate a subset or set of the data parameters to the downstream client 114d on a regular basis. For example, the publisher client 114c may periodically communicate messages having the values of the data parameters in a subset or set to the downstream client 114d. By "periodically," it is meant that the event may occur at regular, repeated time intervals as opposed to irregular or different time intervals (e.g., time intervals that change over time). The downstream client 114d uses one or more of the data parameters that are published in connection with one or more of the functions performed by the downstream client 114d.

Figure 2:
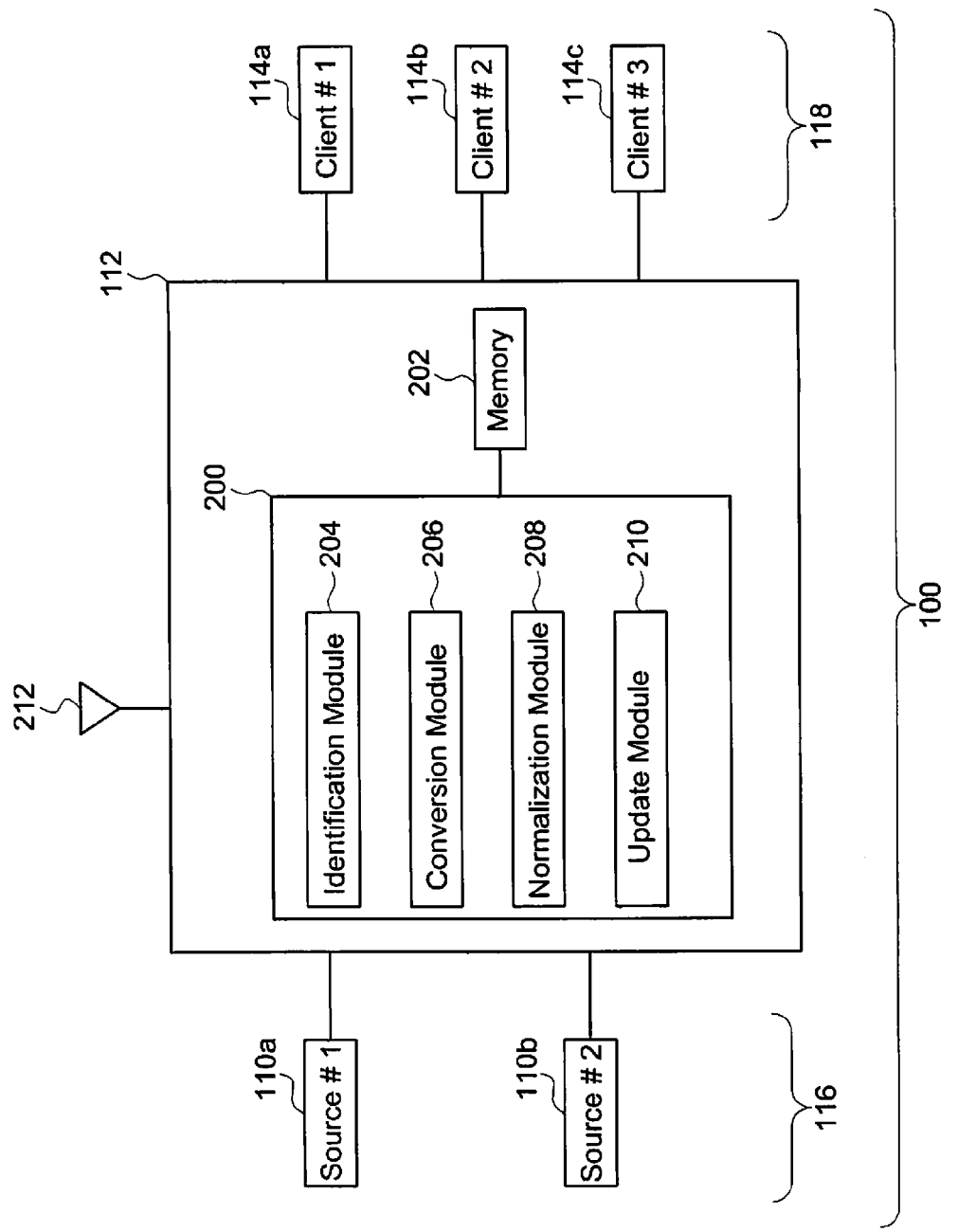
FIG. 2 is a schematic diagram of an interface gateway device shown in FIG. 1 in accordance with one embodiment.

FIG. 2 is a schematic diagram of the interface gateway device 112 in accordance with one embodiment. The interface gateway device 112 may include a hardware and/or software system that operates to perform one or more functions. In the illustrated embodiment, the interface gateway device 112 includes a processor 200 and a computer readable storage medium, or a memory 202, that perform various functions described herein. Alternatively, the interface gateway device 112 may include several modules that operate to cause the processor 200 to perform various functions described herein. For example, the interface gateway device 112 can be programmed or installed onto the memory 202 or into the processor 200 instead of including the processor 200 and/or memory 202. The processor 200 can include a microprocessor, controller, or equivalent control circuitry. The memory 202 can include a tangible and non-transitory computer readable storage medium, such as a physical device that stores data on a temporary or permanent basis for use by the processor 200. The memory 202 may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

The modules of the interface gateway device 112 include an identification module 204. The identification module 204 determines the format that is used by the back end portion 116 of the system 100 to communicate the data representative of values of data parameters and the format that is used by the front end portion 118 of the system to communicate the data. In one embodiment, the format that is used by the back end portion 116 is a predetermined or previously identified format, such as a format that is stored in a configuration file recorded on the processor 200 and/or memory 202. Alternatively, the identification module 204 may determine the format that is used by the back end portion 116.

The identification module 204 can determine the format that is used by the back end portion 116 and/or the front end portion 118 based on a structure or syntax of the messages that are communicated to the interface gateway device 112. For example, the identification module 204 may receive a message from a component in the back end portion 116 (e.g., a data acquisition module 110) or a component in the front end portion 118 (e.g., a client module 114). The identification module 204 may parse out one or more bits or other subsets of the data in the message to identify the format used by the component that sent the message. For example, the identification module 204 can compare a subset or portion of the message with one or more sets of data (e.g., bits) that are associated with different formats and, based on the comparison, determine the format of the message, as described below.

Figure 3:
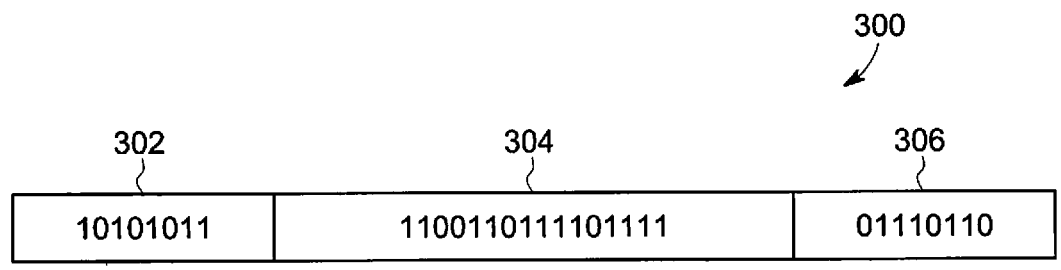
FIG. 3 is a schematic diagram of a message that is sent from a component in a back end portion or in a front end portion of the system shown in FIG. 1 to the interface gateway device also shown in FIG. 1, in accordance with one embodiment.

FIG. 3 is a schematic diagram of a message 300 that is sent from a component in the back end portion 116 or in the front end portion 118 to the interface gateway device 112 in accordance with one embodiment. The message 300 may be communicated as a series of bits that are included or arranged in frames, such as a header frame 302, a data frame 304, and a footer frame 306. Alternatively, the message 300 may be composed of a series of bits that are arranged in another format. The arrangement of the bits in the message 300 may indicate which format is used to communicate the message 300. For example, one or more bits in the header frame 302 and/or the footer frame 306 may indicate the format that is used to communicate the message 300. The data frame 304 can include bits that represent information conveyed by the message 300, such as a value of one or more data parameters described herein.

The interface gateway device 112 shown in FIG. 1 can examine one or more subsets of the header frame 302, the data frame 304, and/or the footer frame 306 to determine the format of the message 300. For example, the identification module 204 (shown in FIG. 2) of the interface gateway device 112 can extract one or more bits of the message 300 and compare the extracted subset of bits to different identification sets of bits associated with different formats of messages. Based on this comparison, the identification module 204 can determine the format of the message 300. In one embodiment, the identification module 204 compares the extracted set of bits from the message 300 (e.g., the first through Nth bits in one or more of the frames 302, 304, and/or 306) to one or more identification sets of bits recorded in a memory structure, such as a table (e.g., a look-up table), list, or other logical structure to determine a degree of match between the extracted bits and the recorded sets. Such a memory structure may be stored on, or represented by, the memory 202. The identification sets may include different sets of bits that are associated with different message formats.

The degree of match between the extracted set from the message 300 and an identification set can be measured as a percentage, fraction, or other quantifiable measurement that represents how much of the extracted set is the same as the identification set. If the degree of match between the extracted set and the identification set exceeds a threshold, then the identification module 204 may determine that the format of the message 300 is a format associated with the identification set in the memory structure (e.g., look-up table). On the other hand, if the degree of match does not exceed the threshold, then the identification module 204 may determine that the format of the message 300 is not the same as the format associated with the identification set in the memory structure.

Figure 4:
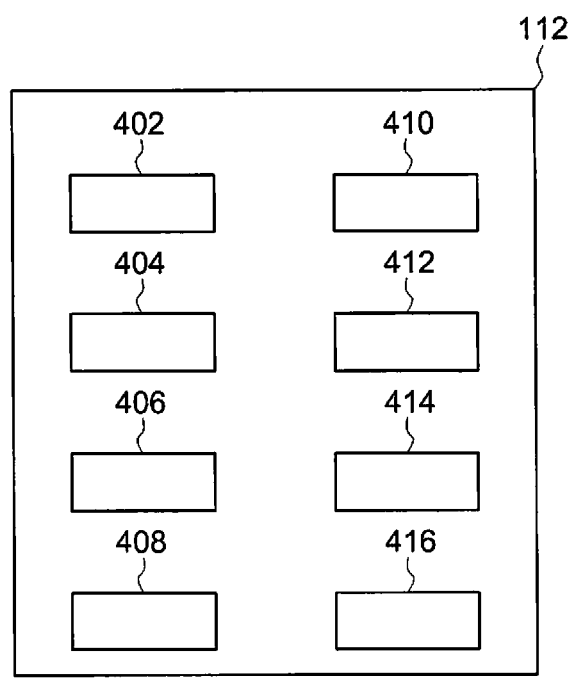
FIG. 4 is another schematic diagram of the interface gateway device shown in FIG. 1 in accordance with one embodiment.

FIG. 4 is another schematic diagram of the interface gateway device 112 in accordance with one embodiment. The identification module 204 (shown in FIG. 2) of the interface gateway device 112 may determine the format of a message based on which physical port of the interface gateway device 112 is coupled with the component that transmitted the message. For example, the interface gateway device 112 may include several ports 402, 404, 406, 408, 410, 412, 414, 416, such as electrical connectors or receptacles, that couple with connectors (e.g., plugs) of the component that transmits the message. The ports 402, 404, 406, 408, 410, 412, 414, 416 may include Ethernet ports, serial ports, parallel ports, and the like, that may be wired or wireless connections, copper connections, fiber optic connections, and the like. The interface gateway device 112 can detect when a component is coupled with one or more of the ports 402, 404, 406, 408, 410, 412, 414, 416. In one embodiment, some of the ports (e.g., the ports 402, 404, 406, 408) are used to couple one or more components in the back end portion 116 (shown in FIG. 1) of the system 100 (shown in FIG. 1) with the interface gateway device 112 while other ports (e.g., the ports 410, 412, 414, 416) are used to couple one or more components in the front end portion 118 (shown in FIG. 1) of the system 100.

The identification module 204 (shown in FIG. 2) of the interface gateway device 112 may associate different formats with messages received through different ports 402, 404, 406, 408, 410, 412, 414, 416. For example, the identification module 204 may determine that messages received from a component coupled with the first port 402 are in a first format, messages received from another component coupled with the second port 404 are in a different, second format, and so on.

The connectors used to couple the components with the ports 402, 404, 406, 408, 410, 412, 414, 416 and/or the ports 402, 404, 406, 408, 410, 412, 414, 416 may include one or more keying features (e.g., projections and complementary slots) that restrict which components can be coupled with various ports 402, 404, 406, 408, 410, 412, 414, 416. The keying features may prevent a component that transmits messages in a first format from being coupled with a port 402, 404, 406, 408, 410, 412, 414, 416 that is associated by the identification module 204 with a different, second format.

In another embodiment, one or more of the components in the back end portion 116 (shown in FIG. 1) and/or the front end portion 118 (shown in FIG. 1) of the system 100 (shown in FIG. 1) may wirelessly communicate with the interface gateway device 112 using one or more wireless communication channels. The communication channels may include different, non-overlapping portions of a frequency spectrum that is used to wirelessly communicate messages with the interface gateway device 112. The identification module 204 (shown in FIG. 2) may associate messages received over different communication channels with different formats. For example, the identification module 204 may associate a first format with messages received over a first wireless communication channel, a different, second format with messages received over a different, second wireless communication channel, and the like.

In another embodiment, a plurality of the components in the back end portion 116 (shown in FIG. 1) and/or the front end portion 118 (shown in FIG. 1) of the system 100 (shown in FIG. 1) may concurrently communicate messages in different formats over a common conductive pathway, such as the same cable, wire, bus, and the like. The different messages may be communicated over different communication channels of the pathway, such as by communicating the messages within different subsets of a frequency spectrum. The identification module 204 (shown in FIG. 2) of the interface gateway module 112 may associate different formats with the messages based on which communication channels over which the messages are received. For example, a message received over a first communication channel may be associated with a first format while messages received over a different, second communication channel may be associated with a different, second format.

Returning to the discussion of the interface gateway device 112 shown in FIG. 2, the interface gateway module 112 can include a conversion module 206. The conversion module 206 converts the format of a message from a first format to a second, different format. For example, the conversion module 206 can change the format of a message received from the back end portion 116 of the system 100 from a first format (e.g., a first closed format) to a different, second format (e.g., an open format or a different, second closed format). The conversion module 206 can convert the format of a message by changing the values and/or order of one or more subsets of the message (e.g., such as the bits in the message 300 shown in FIG. 3).

In one embodiment, the conversion module 206 converts the format of a message by changing an identification of the data parameter value that is conveyed by the message. For example, different data parameters may be identified by different or unique identification numbers or alphanumeric strings. The identifications of the data parameters may be conveyed in the messages (e.g., the message 300 shown in FIG. 3) to notify recipients of the message of the data parameter that is represented by the message. The identifications may be conveyed in the header frame 302 (shown in FIG. 3) of the message that communicates the data parameter.

The identifications used to distinguish between the different data parameters may vary between different formats. The conversion module 206 may change the identification in a message between the identification used by a first format to the identification used by a different, second format. For example, if the data acquisition module 110a uses a first format to convey a message that includes a first identification associated with a data parameter to the interface gateway device 112, the conversion module 206 may change the first identification to a different, second identification associated with the same data parameter but a different, second format before conveying the converted message to one or more of the client modules 114. The identification used in the message of a first format that is received by the interface gateway device 112 may be referred to as an input data parameter identification and the identification used in the message of a second format that is transmitted by the interface gateway device 112 after converting the message may be referred to as an output data parameter identification.

The conversion module 206 may change the identification of the data parameter in the message based on a memory structure, such as a table (e.g., look-up table), list, or other logical structure, that associates the identifications used by different messages with different formats. Such a memory structure may be stored on, or represented by, the memory 202. For example, the identification module 204 may determine the format used by the data acquisition module 110 that acquired the data parameter and the format to which the message that includes the data parameter is to be converted to, as described above. Based on the identified format and the format to be converted to, the conversion module 206 may refer to the memory structure to identify the identifications associated with the two formats and may change the identification in the message. The conversion module 206 may change the identification to match the identification associated with the format to which the message is converted.

In one embodiment, the conversion module 206 converts the format of a message by changing a size of the message. For example, different formats may use different sized messages. By "different sized," it is meant that a first format may use a first number of bits to convey the message 300 (shown in FIG. 3) while a different, second format may use a different, second number of bits to convey the message 300. The size of the message that is received by the interface gateway device 112 may be referred to as an input size of the message and the converted size of the message that is transmitted by the interface gateway device 112 after converting the format of the message may be referred to as an output size of the message.

The conversion module 206 may change the size of the message based on a memory structure, such as a table (e.g., look-up table), list, or other logical structure, that associates the identifications used by different messages with different formats. Such a memory structure may be stored on, or represented by, the memory 202. For example, the identification module 204 may determine the format used by the data acquisition module 110 that acquired the data parameter and the format to which the message that includes the data parameter is to be converted to, as described above. Based on the identified format and the format to be converted to, the conversion module 206 may refer to the memory structure to determine the output size of the message. The conversion module 206 may change the size of the message to match the size associated with the format to which the message is converted. The conversion module 206 may decrease the size of the output message relative to the input message by removing one or more bits of the input message. For example, the conversion module 206 may remove portions of the message that do not change the value of the data parameter to decrease the size of the message. The conversion module 206 may increase the size of the output message relative to the input message by adding one or more bits of the input message. For example, the conversion module 206 may add bits to the message that do not alter the value of the data parameter conveyed by the message.

In one embodiment, the conversion module 206 changes the format of a message by applying a multiplier to one or more values represented by data in the message. For example, the conversion module 206 may multiply the value represented by data in the message by one or more constants to change the value from an initial value to a converted value. The initial value can be the value represented by the message received by the interface gateway device 112 and the converted value can be the value that is conveyed in the message having the converted format and that is sent by the interface gateway device 112. For example, an initial value (I) may be multiplied by a constant (k) to create a converted value (C=I×k). The converted value is included in the message that is sent from the interface gateway module 112 in the converted format.

In another embodiment, the conversion module 206 changes the format of a message by applying a divisor to one or more values represented by data in the message. For example, the conversion module 206 may divide the value represented by data in the message by one or more constants to change the value from an initial value to a converted value. For example, an initial value (I) may be divided by a constant (k) to create a converted value (C=I/k). The converted value is included in the message that is sent from the interface gateway module 112 in the converted format.

In another embodiment, the conversion module 206 changes the format of a message by applying a bias to one or more values represented by data in the message. For example, the conversion module 206 may add or subtract one or more constants to change the value from an initial value to a converted value. For example, an initial value (I) may be changed by a constant (b) to create a converted value (C=I+b). The converted value is included in the message that is sent from the interface gateway module 112 in the converted format.

In another embodiment, the conversion module 206 changes the format of a message by changing a position of a decimal in one or more values represented by data in the message. For example, the conversion module 206 may shift the position of a decimal in a value of an input message to another position of an output message. For example, an input message may include a value of 123.456. The conversion module 206 may convert the format of the input message by shifting the decimal point of the value to 12.3456 or 1234.56 and use the value having the shifted decimal point in a converted output message.

In another embodiment, the conversion module 206 changes the format of an input message by extracting a portion of the input message and conveying the extracted portion in a converted output message. For example, based on the format of the input message and the format of the output message to which the input message is to be converted, the conversion module 206 may determine a start bit and a number of read bits. The conversion module 206 may determine the start bit and/or number of read bits from a memory structure stored on, or represented by, the memory 202 and based on the format of the input message and the format of the output message. As one example, an input message may include the bitstream represented as "HGFEDCBA." The conversion module 206 may convert the format of the input message by extracting a number of read bits from the message starting at a start bit. If the start bit is 4 and the number of read bits is 1, the conversion module 206 may extract the bit "E" from the input message and include the bit "E" in the output message as the converted format of the message.

The above provides some examples of the manners in which the conversion module 206 can change the format of an input message to a different format for an output message. The above examples, however, are not exclusive. Other techniques and methods of converting the format of the messages may be apparent to a person of ordinary skill in the art.

The interface gateway device 112 can include a normalization module 208. The normalization module 208 may change a format of a message by changing a value conveyed by the message. The normalization module 208 can change the value of a data parameter received by the interface gateway device 112 in an input message to a converted value that is output from the interface gateway device 112 in an output message in one embodiment. For example, the numerical data value of a data parameter may need to be converted from a native value to an open defined value or a closed defined value. In one embodiment, the normalization module 208 may change the initial value included in an input message to a converted value that is conveyed from the interface gateway device 112 by applying a multiplier, a divisor, and/or a bias to the initial value, as described above. In another embodiment, the normalization module 208 may change the value by changing or shifting a decimal position of the value in the input message, also as described above.

The normalization module 208 may change the value of an input message to a different value for an output message due to different scales or units used by different components in the back end portion 116 and the front end portion 118 of the system 100. For example, a data acquisition module 110 may obtain the value of a data parameter using a first scale or unit (e.g., in a logarithmic scale and/or in units of feet per second). The interface gateway device 112 receives an input message from the data acquisition module 110 that includes the value of the data parameter in the first scale or unit. The normalization module 208 can refer to a memory structure (e.g., a table or list) to determine how to change the value from a first format to a second format and can accordingly change the value of the data parameter. For example, the normalization module 208 can refer to a look-up table stored on the memory 202 to determine that the client module 114 that will receive the converted output message uses a different scale or unit and to determine how to accordingly change the value. The normalization module 208 may change the value to a modified value having a different, second scale or unit that is used by the client module 114. The gateway interface device 112 may then transmit the output message having the modified value to the client module 114.

The gateway interface module 114 can include an update module 210. The update module 210 can provide one or more of the conversion module 206 and/or the normalization module 208 with updates related to how the format of messages and/or the values included in the messages are changed. As described above, the conversion module 206 and/or the normalization module 208 may refer to a memory structure that provides details on how to convert the format of a message and/or a value included in the message. The update module 210 may update the memory structure. For example, the update module 210 may wirelessly communicate with an off-board device using an antenna 212 to obtain an update to the memory structure. Alternatively, the update module 210 may be coupled with an off-board device via a wired connection, such as when the vehicle 102 (shown in FIG. 1) is stationary.

The update module 210 may periodically check for updates to the memory structures used to convert the format of the messages. Alternatively, the update module 210 may receive updates to the memory structures when the updates are transmitted to the interface gateway device 112. In one embodiment, the update module 210 retrieves an update to the memory structures when the identification module 204 identifies a format used by a component in the back end portion 116 and/or the front end portion 118 of the system 100 that is included in the memory structure. For example, a client module 114 may be added to the system 100 that does not have associated details in the memory structures that allows for the conversion of an input message to a format of an output message that is usable by the client module 114. The update module 210 may obtain an update to the memory structure to include the details used by the conversion module 204 and/or the normalization module 208 to reformat the message for receipt by the newly added client module 114.

Figure 5:
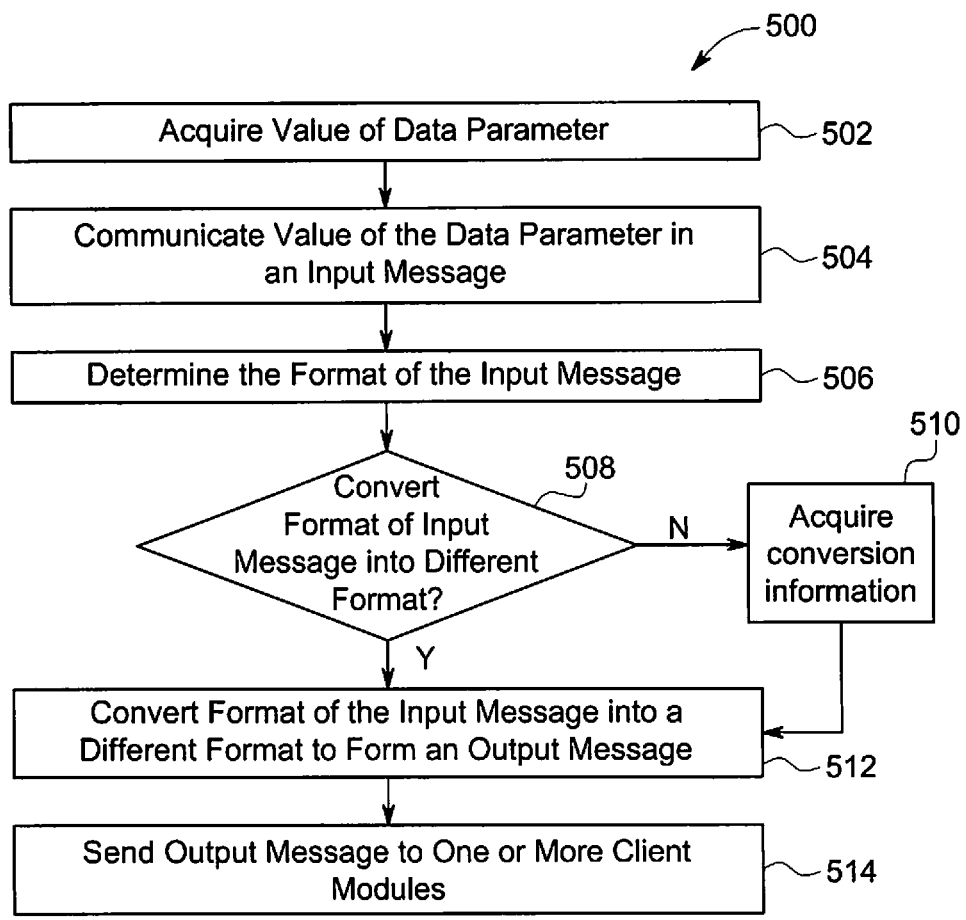
FIG. 5 is a flowchart of one embodiment of a method for converting data that is distributed in a vehicle.

FIG. 5 is a flowchart of one embodiment of a method 500 for converting data that is distributed in a vehicle. The method 500 may be used in conjunction with one or more embodiments of the system 100 (shown in FIG. 1) described herein.

At 502, the values of one or more data parameters are acquired by a data acquisition module 110 (shown in FIG. 1). As described above, the data acquisition module 110 may obtain values of data parameters that are related to or representative of operations of the vehicle 102 shown in FIG. 1.

At 504, the value is communicated from the data acquisition module 110 (shown in FIG. 1) to the interface gateway device 112 (shown in FIG. 1). The value is communicated in a message from the data acquisition module 110 to the interface gateway device 112. The data acquisition module 110 communicates the message according to a first format that may be a closed format (e.g., proprietary format), as described above. Alternatively, the data acquisition module 110 communicates the message according to a first format that may be an open format (e.g., non-proprietary format or publicly available format), also as described above.

At 506, the format of the message is determined. For example, the interface gateway device 112 (shown in FIG. 1) identifies the format of the message received from the data acquisition module 110 (shown in FIG. 1). The format of the message may be determined by examining one or more subsets or portions of the message. Alternatively, the format of the message may be determined based on a port used to couple the data acquisition module 110 with the interface gateway device 112. In another embodiment, the format may be determined based on a communication channel used to convey the message to the interface gateway device 112, as described above. As another example, the format of the message may be identified based on which data acquisition module 110 obtained the value of the data parameter that is communicated by the message. Different data acquisition modules 110 may be associated with different formats. The format of a message received by the interface gateway device 112 can then be identified based on which data acquisition module 110 transmits the message to the interface gateway device 112.

At 508, a determination is made as to whether the format of the message that is received can be converted into another, different message. For example, the interface gateway device 112 (shown in FIG. 1) may determine if the interface gateway device 112 has sufficient information to convert the format of the message that is received from the data acquisition module 110 (shown in FIG. 1) to another, different format for transmission and use by a client module 114 (shown in FIG. 1). For example, the data acquisition module 110 may use a first format to communicate data messages and the client module 114 may use a different, second format to use the data to provide one or more functions related to the vehicle 102 (shown in FIG. 1). The first and second formats may be incompatible with each other. For example, the data acquisition module 110 may be incapable of communicating messages using the second format and/or the client module 114 may be incapable of receiving, understanding, interpreting, and/or using the messages communicated using the first format.

If the interface gateway device 112 (shown in FIG. 1) does not have sufficient information to convert the message between formats, then the interface gateway device 112 may be incapable of converting the message for use by the client module 114 (shown in FIG. 1). As a result, the interface gateway device 112 may need to acquire conversion information to convert the format of the message. Flow of the method 500 may proceed to 510. On the other hand, if the interface gateway device 112 does have the conversion information that is used to convert the message between formats, then the interface gateway device 112 may be capable of converting the message for use by the client module 114 (shown in FIG. 1). As a result, flow of the method 500 may proceed to 512.

At 510, the conversion information is acquired. For example, the interface gateway device 112 (shown in FIG. 1) may download (e.g., via a wireless or wired communication link) the information required to convert the format of the message from the format used by the data acquisition module 110 (shown in FIG. 1) to the format used by the client module 114 (shown in FIG. 1). The interface gateway device 112 may download the information from an off-board source, such as a wireless transmitter coupled to a computing device disposed off of the vehicle 102, or from an on-board source, such as a computing device located on the vehicle 102. The conversion information may include, but is not limited to, directions on which subset of the data in the input message to extract and include in reformatted output message, a multiplier to apply to the data in the input message, a divisor to apply to the data, a bias to apply to the data, a decimal point shift or movement, an input and/or output data parameter identification, an input and/or output size of the message, a start bit, a number of read bits, and the like, as described above.

At 512, the conversion information is used to change the format of the input message. For example, the interface gateway device 112 (shown in FIG. 1) may change the format of the input message to a different format of an output message, as described above. The format of the output message is based on the format that can be used by one or more of the client modules 114 (shown in FIG. 1) in one embodiment. The format of the input message may be a closed format (e.g., a proprietary format) while the format of the output message that is sent to the client module 114 is an open format (e.g., a publicly available format). Alternatively, the format of the input message may be a first closed format while the format of the output message that is sent to the client module 114 is a different, second closed format. In another embodiment, the format of the input message may be an open format while the format of the output message that is sent to the client module 114 is a closed format.

At 514, the output message having the converted format is sent to one or more client modules. For example, the interface gateway device 112 (shown in FIG. 1) may transmit the reformatted output message to one or more of the client modules 114 (shown in FIG. 1). The client modules 114 may then perform one or more functions related to operation of the vehicle 102 (shown in FIG. 1) based on the data included in the output message. For example, one or more of the client modules 114 may use the values of data parameters included in the reformatted output message to control tractive operations and/or braking operations of the vehicle 102.

In accordance with one embodiment, a data conversion system for a vehicle is provided. The system includes an interface gateway device that is configured to be communicatively coupled with a data acquisition module and a client module. The data acquisition module obtains a value of a data parameter related to operation of the vehicle and communicates the value to the interface gateway device in a first message provided in a first format. The interface gateway device is configured to convert the first format of the first message into a different, second format to form a second message and to communicate the second message to the client module. The client module uses the second message to perform a function for the vehicle.

In another aspect, the client module uses data included in the second message to control at least one of tractive effort or braking effort provided by the vehicle.

In another aspect, the first format is a closed format and the second format is an open format.

In another aspect, the first format is a first closed format and the second format is a second closed format.

In another aspect, the first format is an open format and the second format is a closed format.

In another aspect, the interface gateway device is configured to convert the first format of the first message into the second format of the second message by at least one of applying a multiplier or divisor to the value in the first message, applying a bias to the value in the first message, converting a first data parameter identification in the first message into a different, second data parameter identification, moving a decimal point in the value of the first message, or extracting a subset of data included in the first message.

In another aspect, the interface gateway device is configured to download conversion information that is used to convert the first format of the first message into the second format of the second message.

In another embodiment, a data conversion system for a vehicle is provided. The system includes an interface gateway device configured to be communicatively coupled with a data acquisition module and a client module. The interface gateway device also is configured to receive a first message provided in a first format from the data acquisition module. The first message includes a value of a data parameter related to operation of the vehicle. The interface gateway device also is configured to convert the first format of the first message into a different, second format to form a second message and to communicate the second message to the client module for use in performing a function for the vehicle.

In another embodiment, another data conversion system for a vehicle is provided. The system includes a first client module configured to be communicatively coupled with an interface gateway device and one or more second client modules. The first client module is configured to receive a data parameter from the interface gateway device in a first message having a closed format. The data parameter is related to operation of the vehicle. The first client module is configured to publish the data parameter for communication of the data parameter to the one or more second client modules for use in performing a function for the vehicle.

In another aspect, the system also includes the interface gateway device, with the interface gateway device being configured to receive the data parameter from a data acquisition module in a second message having an open format, to convert the second message to the first message having the closed format, and to communicate the first message to the first client module.

In another embodiment, a method for converting data for a vehicle is provided. The method includes receiving a value of a data parameter related to operation of the vehicle in a first message from a data acquisition module. The first message is provided in a first format. The method also includes converting the first format of the first message into a different, second format to form a second message and communicating the second message to a client module, the client module using the second message to perform a function for the vehicle.

In another aspect, the method also includes using data included in the second message to control at least one of tractive effort or braking effort provided by the vehicle.

In another aspect, the first format is a closed format and the second format is an open format.

In another aspect, the first format is a first closed format and the second format is a second closed format.

In another aspect, the first format is an open format and the second format is a closed format.

In another aspect, the second message is communicated to a first client module, and the method further includes the first client module publishing the data parameter for receipt and use by one or more second client modules to perform the function for the vehicle or another function.

In another aspect, the converting step includes converting the first format of the first message into the second format of the second message by at least one of applying a multiplier or divisor to the value in the first message, applying a bias to the value in the first message, converting a first data parameter identification in the first message into a different, second data parameter identification, moving a decimal point in the value of the first message, or extracting a subset of data included in the first message.

In another aspect, the method also includes downloading conversion information that is used to convert the first format of the first message into the second format of the second message.

In another embodiment, a computer readable storage medium for a data conversion system in a vehicle having a processor is provided. The computer readable storage medium includes one or more sets of instructions that direct the processor to receive a value of a data parameter related to operation of the vehicle in a first message from a data acquisition module. The first message is provided in a first format. The one or more sets of instructions also direct the processor to convert the first format of the first message into a different, second format to form a second message and to communicate the second message to a client module for use in performing a function for the vehicle.

In another aspect, the computer readable storage medium is a tangible and non-transitory computer readable storage medium.

In another aspect, the second message includes data for use in controlling at least one of tractive effort or braking effort provided by the vehicle.

In another aspect, the first format is a closed format and the second format is an open format.

In another aspect, the first format is a first closed format and the second format is a second closed format.

In another aspect, the first format is an open format and the second format is a closed format.

In another aspect, the one or more sets of instructions direct the processor to convert the first format of the first message into the second format of the second message by at least one of applying a multiplier or divisor to the value in the first message, applying a bias to the value in the first message, converting a first data parameter identification in the first message into a different, second data parameter identification, moving a decimal point in the value of the first message, or extracting a subset of data included in the first message.

In another aspect, the one or more sets of instructions direct the processor to download conversion information that is used to convert the first format of the first message into the second format of the second message.

In another embodiment, another data conversion system for a vehicle is provided. The system includes a client module that is configured to receive a second message from an interface gateway device to perform one or more functions related to the vehicle. The second message includes data that is acquired by a data acquisition module and communicated by the data acquisition module to the interface gateway device in a first message provided in a first format that differs from the second format of the second message. The interface gateway device receives the first message in the first format and converts the first message into the second format to form the second message and communicates the second message to the client module.

In another aspect, the client module uses data included in the second message to control at least one of tractive effort or braking effort provided by the vehicle.

In another aspect, the first format is a closed format and the second format is an open format.

In another aspect, the first format is a first closed format and the second format is a second closed format.

In another aspect, the first format is an open format and the second format is a closed format.

In another aspect, the first format of the first message into the second format of the second message by at least one of applying a multiplier or divisor to the value in the first message, applying a bias to the value in the first message, converting a first data parameter identification in the first message into a different, second data parameter identification, moving a decimal point in the value of the first message, or extracting a subset of data included in the first message.

In another embodiment, a data conversion system for a vehicle is provided. The system includes an interface gateway device that is configured to be communicatively coupled with a data acquisition module and a client module. The interface gateway also is configured to receive a first message provided in a first format from the data acquisition module. The first message includes a value of a data parameter related to operation of the vehicle. The interface gateway device is configured to convert the first format of the first message into a different, second format to form a second message and to communicate the second message to the client module for use in performing a function for the vehicle.

In another embodiment, a method for converting data for a vehicle includes receiving a data parameter related to operation of the vehicle in a first message. The first message is provided in a closed format and the data parameter is received from an interface gateway device that receives the data parameter from a data acquisition module in an open format. The method also includes publishing the data parameter for communication to one or more client modules to use the data parameter for a function of the vehicle.

In another aspect, the method includes, at the interface gateway device, receiving the data parameter from the data acquisition module in a second message having the open format, converting the second message to the first message in the closed format, and communicating the first message.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable a person of ordinary skill in the art to practice the embodiments of inventive subject matter, including making and using any devices or systems and performing any incorporated methods. The patentable scope of the inventive subject matter is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of, the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A data conversion system for a vehicle, the system comprising: an interface gateway device configured to be communicatively coupled with a data acquisition module and a client module, the data acquisition module obtaining a value of a data parameter related to operation of the vehicle and communicating the value to the interface gateway device in a first message provided in a first format;
wherein the interface gateway device is configured to, using one or more processors, convert the first format of the first message into a different, second format to form a second message and to communicate the second message to the client module, for the client module to use the second message to perform a function for the vehicle;
wherein the interface gateway device is configured to convert the first format of the first message into the second format of the second message by at least one of applying a multiplier or divisor to change the value in the first message to a converted value that is communicated in the second message; applying a bias to change the value in the first message to a converted value that is communicated in the second message; converting a first data parameter identification in the first message into a different, second data parameter identification that is communicated in the second message; moving a decimal point to change the value of the first message to a converted value that is communicated in the second message; or extracting a subset of data included in the first message such that the extracted subset is communicated in the second message instead of all of the data in the first message.

2. The system of claim 1, wherein the client module uses data included in the second message to control at least one of tractive effort or braking effort provided by the vehicle.

3. The system of claim 1, wherein one of the first format and the second format is a closed format and the other of the first format and the second format is an open format, the closed format having rules of syntax that are not publicly available and the open format having rules of syntax that are publicly available.

4. The system of claim 1, wherein the interface gateway device is configured to download conversion information from at least one of an on-board source or an off-board source that is used to convert the first format of the first message into the second format of the second message.

5. The system of claim 1, wherein the interface gateway device, the data acquisition module, and the client module are disposed onboard the vehicle, wherein the vehicle is one vehicle that is configured to be interconnected to other vehicles in a vehicle consist.

6. The system of claim 1, wherein the value is a first value, the first value being a measurement of the data parameter, the second message including the first value or a converted value that is indicative of the measurement and that is converted from the first value.

7. The system of claim 1, wherein the first and second formats have different rules of syntax.

8. The system of claim 1, wherein the value in the first message includes a numerical value, the interface gateway device configured to change the numerical value in the first message to a different numerical value in the second message.

9. The system of claim 1, wherein the value is a measurement obtained from at least one of a propulsion subsystem or a braking subsystem of the vehicle.

10. The system of claim 9, wherein the measurement is a measurement of the braking subsystem of the vehicle, the measurement identifying at least one of an air pressure of a corresponding air brake, an air pressure of a corresponding brake reservoir, current from a corresponding regenerative brake, a setting of the corresponding air brake, or a setting of the corresponding regenerative brake.

11. The system of claim 9, wherein the measurement is a measurement of the propulsion subsystem of the vehicle, the measurement identifying at least one of horsepower generated by a traction motor; wheel slippage of a wheel connected to the traction motor; a temperature measurement of at least one of a bearing, the wheel, or axle interconnected with the traction motor; or a throttle or notch setting.

12. A data conversion system for a vehicle, the system comprising: an interface gateway device configured to be communicatively coupled with a data acquisition module and a client module, the interface gateway device configured to receive a first message provided in a first format from the data acquisition module, the first message including a value of a data parameter related to operation of the vehicle;
wherein the interface gateway device is configured to, using one or more processors, convert the first format of the first message into a different, second format to form a second message and to communicate the second message to the client module for use in performing a function for the vehicle, the value of the data parameter including a numerical value, the interface gateway device configured to change the numerical value of the data parameter in the first message to a different numerical value in the second message;
wherein the interface gateway device is configured to convert the first format of the first message into the second format of the second message by at least one of applying a multiplier or divisor to change the value in the first message to a converted value that is communicated in the second message; applying a bias to change the value in the first message to a converted value that is communicated in the second message; converting a first data parameter identification in the first message into a different, second data parameter identification that is communicated in the second message; moving a decimal point to change the value of the first message to a converted value that is communicated in the second message; or extracting a subset of data included in the first message such that the extracted subset is communicated in the second message instead of all of the data in the first message.

13. A data conversion system for a vehicle, the system comprising:
an interface gateway device configured to receive, from a data acquisition module, a data parameter in a first message having a first format and to convert the first message to a second message having a second format, the data parameter related to operation of the vehicle, wherein the interface gateway device is configured to, using one or more processors, convert the first format of the first message into the second format of the second message by at least one of applying a multiplier or divisor to change the value in the first message to a converted value that is communicated in the second message; applying a bias to change the value in the first message to a converted value that is communicated in the second message; converting a first data parameter identification in the first message into a different, second data parameter identification that is communicated in the second message; moving a decimal point to change the value of the first message to a converted value that is communicated in the second message; or extracting a subset of data included in the first message such that the extracted subset is communicated in the second message instead of all of the data in the first message;

a first client module configured to be communicatively coupled with the interface gateway device and one or more second client modules;

wherein the first client module is configured to receive the second message and publish the data parameter for communication of the data parameter to the one or more second client modules for use in performing a function for the vehicle.

14. The system of claim 13, wherein the first message has a closed format and the second message has an open format.

15. A method for converting data for a single vehicle, the method comprising:

receiving a value of a data parameter related to operation of the vehicle in a first message from a data acquisition module, the first message provided in a first format;

converting, using one or more processors, the first format of the first message into a different, second format to form a second message; and communicating the second message to a client module, for the client module to use the second message to perform a function for the vehicle, wherein each of the data acquisition module and the client module is located onboard the vehicle;

wherein converting the first format of the first message into the second format of the second message includes at least one of applying a multiplier or divisor to change the value in the first message to a converted value that is communicated in the second message; applying a bias to change the value in the first message to a converted value that is communicated in the second message; converting a first data parameter identification in the first message into a different, second data parameter identification that is communicated in the second message; moving a decimal point to change the value of the first message to a converted value that is communicated in the second message; or extracting a subset of data included in the first message such that the extracted subset is communicated in the second message instead of all of the data in the first message.

16. The method of claim 15, further comprising using data included in the second message to control at least one of tractive effort or braking effort provided by the vehicle.

17. The method of claim 15, wherein one of the first format and the second format is a closed format and the other of the first format and the second format is an open format, the closed format having rules of syntax that are not publicly available and the open format having rules of syntax that are publicly available.

18. The method of claim 15, further comprising downloading conversion information from at least one of an on-board source or an off-board source that is used to convert the first format of the first message into the second format of the second message.

19. The method of claim 15, wherein converting the first format of the first message into the second format of the second message is executed by an interface gateway device that is communicatively coupled to the data acquisition module and the client module and is located onboard the vehicle.

20. The method of claim 15, wherein the vehicle that includes the data acquisition module, the interface gateway device, and at least one of the client modules is one vehicle that is configured to be interconnected to other vehicles in a vehicle consist.

21. The method of claim 15, wherein the vehicle is a receiving vehicle, the method further comprising communicating the first message from a remote vehicle that is interconnected with the receiving vehicle.

22. The method of claim 15, wherein the value in the first message includes a numerical value, and wherein converting the first format of the first message into the second format of the second message includes changing the numerical value in the first message to a different numerical value in the second message.

23. The method of claim 15, wherein the value is a measurement obtained from at least one of a propulsion subsystem or a braking subsystem of the vehicle.

24. A method for converting data for a single vehicle, the method comprising:

receiving, at an interface gateway device, a data parameter in a first message having a closed format, the data parameter related to operation of the vehicle;

converting, using one or more processors, the closed format of the first message into a different, open format to form a second message, the closed format having rules of syntax that are not publicly available and the open format having rules of syntax that are publicly available;

wherein converting the closed format of the first message into the open format of the second message also includes at least one of applying a multiplier or divisor to change the value in the first message to a converted value that is communicated in the second message; applying a bias to change the value in the first message to a converted value that is communicated in the second message; converting a first data parameter identification in the first message into a different, second data parameter identification that is communicated in the second message; moving a decimal point to change the value of the first message to a converted value that is communicated in the second message; or extracting a subset of data included in the first message such that the extracted subset is communicated in the second message instead of all of the data in the first message; and publishing the data parameter for communication to one or more client modules to use the data parameter for a function of the vehicle.

25. The method of claim 24, wherein the vehicle is one vehicle that is configured to be interconnected to other vehicles in a vehicle consist.

* * * * *